United States Patent
Koizumi

(10) Patent No.: US 12,077,146 B2
(45) Date of Patent: Sep. 3, 2024

(54) PROCESS ALLOCATION CONTROL METHOD, PROCESS ALLOCATION CONTROL SYSTEM, PROCESS ALLOCATION CONTROL DEVICE, AND SERVER DEVICE

(71) Applicant: DENSO CORPORATION, Kariya (JP)

(72) Inventor: Seiichi Koizumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 562 days.

(21) Appl. No.: 17/463,765

(22) Filed: Sep. 1, 2021

(65) Prior Publication Data
US 2021/0394736 A1    Dec. 23, 2021

Related U.S. Application Data

(63) Continuation of application No. PCT/JP2020/004298, filed on Feb. 5, 2020.

(30) Foreign Application Priority Data

Mar. 6, 2019    (JP) .................. 2019-040952

(51) Int. Cl.
*B60W 10/26* (2006.01)
*B60R 16/023* (2006.01)
(Continued)

(52) U.S. Cl.
CPC ......... *B60W 10/26* (2013.01); *B60R 16/0232* (2013.01); *B60W 50/0205* (2013.01);
(Continued)

(58) Field of Classification Search
CPC .. B60W 10/26; B60W 50/0205; B60W 50/14; B60W 2050/021; B60W 2510/244;
(Continued)

(56) References Cited

U.S. PATENT DOCUMENTS

2008/0165786 A1* 7/2008 Ahuja .................. H04L 45/00
370/395.2
2017/0019462 A1   1/2017 Hara
(Continued)

FOREIGN PATENT DOCUMENTS

| JP | 2015014985 A | 1/2015 |
| JP | 6256594 B2 | 1/2018 |

(Continued)

*Primary Examiner* — Richard M Camby
(74) *Attorney, Agent, or Firm* — Harness, Dickey & Pierce, P.L.C.

(57) ABSTRACT

A process allocation control method is provided that controls, in a system including an in-vehicle computer mounted in the vehicle and an external computer provided external to the vehicle as nodes communicable with each other, allocation of a process related to driving assistance of the vehicle to the nodes. The process allocation control method includes: estimating an allocation risk of the process being interrupted in cases of allocating the process to either of the nodes, based on at least one of a remaining battery charge of the vehicle or a communication status between the nodes; and determining the node to which the process should be allocated, based on the allocation risk.

11 Claims, 8 Drawing Sheets

(51) Int. Cl.
*B60W 50/02* (2012.01)
*B60W 50/14* (2020.01)

(52) U.S. Cl.
CPC ....... *B60W 50/14* (2013.01); *B60W 2050/021* (2013.01); *B60W 2510/244* (2013.01); *B60W 2710/244* (2013.01)

(58) Field of Classification Search
CPC ......... B60W 2710/244; B60R 16/0232; G06Q 10/08; G06Q 50/40; G06Q 10/047; G06Q 10/0631; G06Q 10/0635; G06Q 10/083; B60L 2240/70; B60L 2250/10; B60L 50/60; B60L 58/12; Y02D 10/00; Y02T 10/70; Y02T 10/72; Y02T 90/16; G08G 1/20; G06F 9/5094; G06N 20/00
See application file for complete search history.

(56) References Cited

U.S. PATENT DOCUMENTS

| | | | | |
|---|---|---|---|---|
| 2019/0272372 A1* | 9/2019 | Ananthanpillai | ... | G06F 3/04842 |
| 2020/0010080 A1* | 1/2020 | Weldemariam | ..... | B60W 30/095 |

FOREIGN PATENT DOCUMENTS

| | | | |
|---|---|---|---|
| JP | 2018181034 A | 11/2018 | |
| JP | 2018185669 A | 11/2018 | |
| WO | WO-2012114889 A1 | 8/2012 | |

* cited by examiner

PROCESS ALLOCATION CONTROL METHOD, PROCESS ALLOCATION CONTROL SYSTEM, PROCESS ALLOCATION CONTROL DEVICE, AND SERVER DEVICE

CROSS REFERENCE TO RELATED APPLICATIONS

This application is a continuation application of PCT/JP2020/004298 filed on Feb. 5, 2020, which designated the U.S. and claims the benefit of priority from Japanese Patent Application No. 2019-040952 filed on Mar. 6, 2019. The entire disclosures of all of the above applications are incorporated herein by reference.

FIELD

The present disclosure relates to a technology of allocating processes related to a vehicle driving-assistance.

BACKGROUND

There is a technology for system enhancing in a system including nodes depending on node load.

SUMMARY

The present disclosure provides a process allocation control method, a process allocation control system, a process allocation control device, and a server device.

In a first aspect of the present disclosure, there is provided a process allocation control method of controlling allocation of a process related to driving assistance of a vehicle to nodes. The nodes are an in-vehicle computer mounted in the vehicle and an external computer provided external to the vehicle. The process allocation control method comprises: estimating an allocation risk of the process being interrupted in cases of allocating the process to either of the nodes, based on at least one of a remaining battery charge of the vehicle or a communication status between the nodes.

In a second aspect of the present disclosure, there is provided a process allocation control system comprising nodes. The nodes are an in-vehicle computer mounted in a vehicle and an external computer provided external to the vehicle. The process allocation control system controls allocation of a process related to driving assistance of the vehicle to the nodes. The process allocation control system estimates an allocation risk of the process being interrupted in cases of allocating the process to either of the nodes, based on at least one of a communication status between the nodes or a remaining battery charge of the vehicle.

In a third aspect of the present disclosure, there is provided a process allocation control device mounted in a vehicle to control, in a system including an in-vehicle computer mounted in the vehicle and an external computer provided external to the vehicle as nodes communicable with each other, allocation of a process related to driving assistance of the vehicle to the nodes. The process allocation control device estimates an allocation risk of the process being interrupted in cases of allocating the process to either of the nodes, based on at least one of a communication status between the nodes or a remaining battery charge of the vehicle.

In a fourth aspect of the present disclosure, there is provided a server device that is configured to communicate with an in-vehicle computer mounted in a vehicle and that is provided external to the vehicle. The server device estimates an allocation risk of the process being interrupted in cases of allocating the process to either of the in-vehicle computer and the server device, based on at least one of remaining battery charge of the vehicle or a communication status between the in-vehicle computer and the server device.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
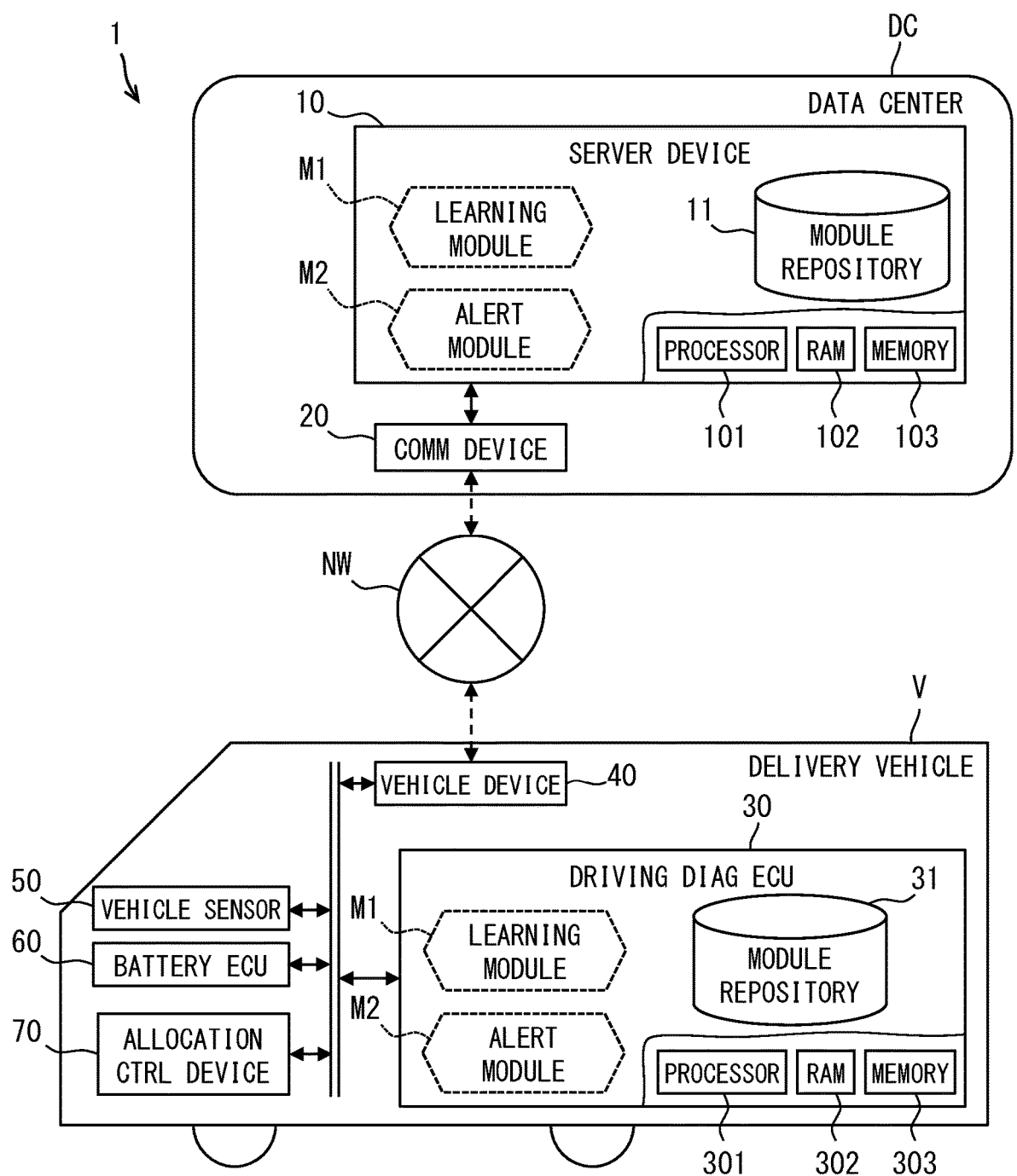
FIG. 1 is a block diagram showing an outline of a driving assistance system according to a first embodiment.

There is a technology for system enhancing depending on server load in a system where plural servers are connected as nodes. In this technology, a respective server determines whether to perform the system enhancing based on an average of loads on servers thereunder in a tree structure. When the server determines to perform the system enhancing, the server adds a server thereunder.

The technology does not take into consideration of conditions other than the server load to allocate, to a respective server, a process to be executed by the system. For example, in an assumed system including an in-vehicle computer mounted in a vehicle and a server device outside the vehicle as nodes, a change in vehicle condition may cause an occurrence of difficulty in continuing the process, depending on process allocation to nodes.

It is an object of the present disclosure to provide a process allocation control method, a process allocation control system, a process allocation control device, and a server device that can continue a process.

In an example of the present disclosure, there is provided a process allocation control method of controlling, in a system including an in-vehicle computer mounted in the vehicle and an external computer provided external to the vehicle as nodes communicable with each other, allocation of a process related to driving assistance of the vehicle to the nodes. The process allocation control method executed by at least one processor comprises: estimating an allocation risk of the process being interrupted in cases of allocating the process to either of the nodes, based on at least one of a remaining battery charge of the vehicle or a communication status between the nodes; and determining the node to which the process should be allocated, based on the allocation risk.

In an example of the present disclosure, there is provided a process allocation control system comprising nodes communicable with each other. The nodes are an in-vehicle computer mounted in a vehicle and an external computer provided external to the vehicle and controls allocation of a process related to driving assistance of the vehicle to the nodes. The process allocation control system further comprises: an allocation risk estimator unit that estimates an allocation risk of the process being interrupted in cases of allocating the process to either of the nodes, based on at least one of a communication status between the nodes or a remaining battery charge of the vehicle; and an allocation determiner unit that determines the node to which the process should be allocated, based on the allocation risk.

In an example of the present disclosure, there is provided a process allocation control device mounted in a vehicle to control, in a system including an in-vehicle computer mounted in the vehicle and an external computer provided external to the vehicle as nodes communicable with each other, allocation of a process related to driving assistance of the vehicle to the nodes. The process allocation control device comprises: an allocation risk estimator unit that estimates an allocation risk of the process being interrupted in cases of allocating the process to either of the nodes, based on at least one of a communication status between the nodes or a remaining battery charge of the vehicle; and an allocation determiner unit that determines the node to which the process should be allocated, based on the allocation risk.

In an example of the present disclosure, there is provided a server device that is configured to communicate with an in-vehicle computer mounted in a vehicle and that is provided external to the vehicle. The server device comprises: an allocation risk estimator unit that estimates an allocation risk of the process being interrupted in cases of allocating the process to either of the in-vehicle computer and the server device, based on at least one of remaining battery charge of the vehicle or a communication status between the in-vehicle computer and the server device; and an allocation determiner unit that determines the node to which the process should be allocated, based on the allocation risk.

With these technologies, the allocation risk of the process related to the driving assistance being interrupted is estimated based on at least one of the remaining battery charge of the vehicle and the communication status between the nodes, and the node to which the process should be allocated is determined based on the allocation risk. Therefore, an occurrence of interruption of the process related to the driving assistance due to at least one of the communication status and the remaining battery charge is avoidable. Therefore, the process allocation control method, the process allocation control system, the process allocation control device, and then server device can continue the process.

First Embodiment

A driving assistance system 1 of a first embodiment will be described with reference to FIGS. 1 to 7. The driving assistance system 1 according to the first embodiment of the present disclosure shown in FIG. 1 provides a driving assistance service for a driver in a delivery vehicle V which delivers packages. Specifically, the driving assistance system 1 collects traveling data of the delivery vehicle V, learns driving characteristics of the driver, and diagnoses the driving of the driver based on the learned driving characteristics. The driving assistance system 1 appropriately notifies the driver of the alert or the like based on a diagnosis result to provide the driving assistance service to the driver.

The driving assistance system 1 includes a plurality of nodes wirelessly communicable with each other. As the nodes, the driving assistance system 1 includes an allocation control device 70 and a driving diagnosis ECU 30 which are mounted in the delivery vehicle V, and further includes a server device 10 which is installed in a data center DC.

The allocation control device 70 and the driving diagnosis ECU 30 are electronic control units (ECU) mounted in the delivery vehicle V. The allocation control device 70 and the driving diagnosis ECU 30 are connected to each other so as to be communicable with each other via a communication bus of an in-vehicle network based on a communication protocol such as CAN (registered trademark). An in-vehicle device 40, a vehicle-mounted sensor 50, and a battery ECU 60 are connected to the in-vehicle network.

The vehicle-mounted sensor 50 is a sensor that detects the driving operation of the driver. The vehicle-mounted sensor 50 includes, for example, an accelerator opening degree sensor, a brake sensor, a steering angle sensor, and the like. The vehicle-mounted sensor 50 may include a sensor that can detect a behavior of the delivery vehicle V, such as a vehicle speed sensor, an acceleration sensor, etc. The vehicle-mounted sensor 50 may include an outside camera, an outside sensor such as an LIDAR, a millimeter wave radar, etc., a sensor for detecting a vehicle failure, and the like.

The in-vehicle device 40 is a vehicle-mounted communication device that performs mobile communication in accordance with a wide-area wireless communication standard such as long Term Evolution (LTE), 5G, etc., and an LPWA communication standard such as Wi-Fi HaLow (Wi-Fi is a registered trademark). The in-vehicle device 40 transmits and receives information to and from the server device 10 via a mobile communication base station and a network NW. The in-vehicle device 40 includes an antenna for transmitting and receiving radio waves for communication and a control circuit for performing signal processing related to transmission and reception of the radio waves. The in-vehicle device 40 can measure a received signal strength of the received radio wave. The in-vehicle device 40 successively outputs the measured received signal strength to the allocation control device 70.

The battery ECU 60 is an in-vehicle ECU that monitors a remaining battery level of the battery mounted in the delivery vehicle V. The battery ECU 60 successively outputs the remaining battery charge level to the allocation control device 70.

The allocation control device 70 determines to which node a respective process for providing the driving assistance service should be allocated. Details of the configuration and function of the allocation control device 70 will be described later.

The driving diagnosis ECU 30 is an in-vehicle ECU that includes, as its main component, a microcomputer, the microcomputer including a processor 301, a RAM 302, a memory device 303, an input/output interface, and a bus connecting these. The driving diagnosis ECU 30 includes a module repository 31 as a storage area secured in the memory device 303. The module repository 31 stores programs that respectively cause execution of a learning module M1 and an alert module M2, which will be described later.

The learning module M1 and the alert module M2 are process modules that implement the driving assistance service. The process module is a specific functional module in the driving assistance service that is exhibited by executing a corresponding program. Plural process modules include the learning module M1 and the alert module M2. When the program is read from a module repository 11 and executed, the corresponding process module is allocated to the server device 10.

The learning module M1 provides a function (hereinafter, learning function) to execute a learning process of collecting and accumulating the traveling data of the delivery vehicle V to learn the driving characteristics of the driver. Specifically, the learning module M1 acquires and accumulates, as the traveling data, CAN information acquired from the in-vehicle network such as accelerator opening degree information, braking operation information, and steering angle information acquired from the vehicle-mounted sensor 50. The learning module M1 extracts driving patterns from the accumulated data and further extracts a feature for each driving pattern to learn the driving characteristics of the driver and generate a driving characteristic model. The learning module M1 outputs the generated driving characteristic model to the alert module M2.

The alert module M2 provides a function (hereinafter referred to as a diagnosis function) to execute a diagnosis process of diagnosing the driving operation of the driver and a function to execute an alert process of outputting an alert according to diagnosis result. The alert module M2 diagnoses an operation state of the driver based on the CAN information and the driving characteristic model output from the learning module M1. The alert module M2 outputs an alert signal to an alert device upon determining, based on the diagnosis result, that the driving operation of the driver is a low safety level.

When the driving characteristic model of the driver is un-acquirable, the alert module M2 stops using the driving characteristic model of the driver. In this case, the alert module M2 diagnoses the operation state by combining a preset general driving behavior model with the CAN information instead of the driving characteristic model of a specific driver.

The server device 10 includes, as its main component, a computer, the computer including a processor 101, a RAM 102, a memory device 103, an input/output interface, and a bus connecting these. The server device 10 is connected to the network NW via a communication device 20. The server device 10 is an example of an external computer provided external to the delivery vehicle V.

The server device 10 includes the module repository 11 as a storage area secured in the memory device 103. The module repository 11 stores programs that respectively cause execution of the learning module M1 and the alert module M2, in the same manner as the module repository 31 of the driving diagnosis ECU 30.

Specifically, in the driving assistance system 1, both the driving diagnosis ECU 30 and the server device 10 can respectively execute the learning function and the diagnosis function which are related to the driving assistance service. The driving assistance system 1 can execute both the process modules M1 and M2 on any one of the driving diagnosis ECU 30 and the server device 10 to implement the driving assistance service. The driving assistance system 1 can also implement the driving assistance service by combining: the learning module M1 executed by one node being one of the driving diagnosis ECU 30 and the server device 10; and the alert module M2 executed by the other node being the other of the driving diagnosis ECU 30 and the server device 10.

Each of the learning module M1 and the alert module M2 can be allocated to any of the driving diagnosis ECU 30 and the server device 10. Allocating a process module to a device means executing, by the device, the function corresponding to the process module. An allocation determination process for determining the allocation of the respective modules M1 and M2 is executed by the allocation control device 70.

Next, details of the configuration and function of the allocation control device 70 will be described. The allocation control device 70 includes, as its main component, a microcomputer, the microcomputer including a processor 701, a RAM 702, a memory device 703, an input/output interface, and a bus connecting these. The allocation control device 70 implements a process allocation control method for the process modules M1 and M2 by executing the process allocation control program stored in the memory device 703.

Figure 2:
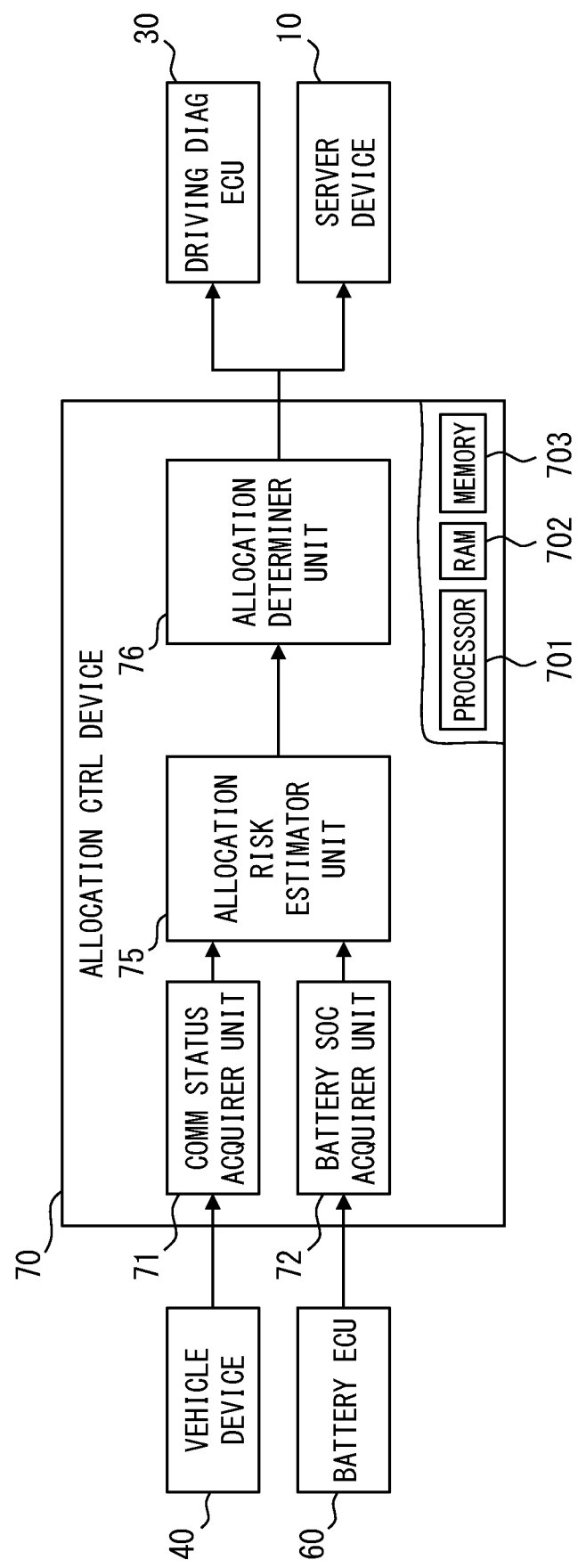
FIG. 2 is a block diagram showing a control configuration of an allocation control device according to the first embodiment.

As shown in FIG. 2, the allocation control device 70 includes a communication status acquirer unit 71, a remaining battery charge acquirer unit 72, an allocation risk estimator unit 75, and an allocation determiner unit 76 as functional blocks implemented by executing the process allocation control program.

The communication status acquirer unit 71 acquires a communication status between the driving diagnosis ECU 30 and the server device 10. For example, the communication status acquirer unit 71 acquires as the communication status the received signal strength of a signal from the network NW detected by the in-vehicle device 40. The remaining battery charge acquirer unit 72 acquires the remaining battery charge from the battery ECU 60.

The allocation risk estimator unit 75 estimates the allocation risk of the execution of the process module M1, M2 being interrupted in cases of allocating the process module M1, M2 to the nodes of the driving assistance system 1. The allocation risk estimator unit 75 estimates the allocation risk based on both the acquired communication status and the remaining battery charge. The allocation risk estimator unit 75 estimates the allocation risk for each of four allocation patterns of the learning module M1 and the alert module M2 to the server device 10 and the driving diagnosis ECU 30, wherein the learning module M1 and the alert module M2 are the process modules, and the server device 10 and the driving diagnosis ECU 30 are the nodes.

The allocation risk estimator unit 75 calculates the allocation risk as a quantified value (hereinafter referred to as an allocation risk value) to make it possible to, by allocation risk comparison, determine which nodes the process modules M1 and M2 should be allocated to. The higher the possibility that the driving assistance service is interrupted due to a combination of the process module with the allocation node, the greater the allocation risk value is. An upper limit value is set for the allocation risk value. The upper limit value is a threshold for prohibiting the combination of the process module with the allocation node when the allocation risk value reaches the threshold.

More specifically, the allocation risk estimator unit 75 quantifies the communication status-based risk as a communication risk value and the remaining battery charge-based risk a power supply risk value, for calculating the allocation risk value. For example, the allocation risk estimator unit 75 calculates the allocation risk value in a case of allocating each of the process modules M1 and M2 to the server device 10, based on the following equations 1 and 2. The allocation risk estimator unit 75 calculates the allocation risk value in a case of allocating the process modules M1 and M2 to the driving diagnosis ECU 30, based on the following equations 3 and 4.

$$M1 = \text{allocation coefficient } a1 \times \text{communication risk value} \quad \text{(Equation 1)}$$

Allocation risk value of learning module

Allocation risk value of alert module $M2$=allocation coefficient $a2$×communication risk value    (Equation 2)

Allocation risk value of learning module $M1$=allocation coefficient $a3$×communication risk value+allocation coefficient $b1$×power supply risk value    (Equation 3)

Allocation risk value of alert module $M2$=allocation coefficient $a4$×communication risk value+allocation coefficient $b2$×power supply risk value    (Equation 4)

In the above equations 1 to 4, the communication risk value is a value obtained by quantifying the communication status. The less the received signal strength acquired by the communication status acquirer unit 71, the greater the communication risk value is. The power supply risk value is a value obtained by quantifying the remaining battery charge. The lower the remaining battery charge acquired by the remaining battery charge acquirer unit 72, the greater the power supply risk value is.

The allocation coefficients $a1$ to $a4$ are coefficients multiplied by the communication risk value, and determine degrees of influence of the communication risk value on the allocation risk value for each node. With regard to the same process module, the allocation coefficients $a1$ to $a4$ are provided such that the allocation coefficients for the server device 10 are greater than the allocation coefficients for the driving diagnosis ECU 30. Specifically, relationships are $a1>a3$ and $a2>a4$. The allocation coefficients $a1$ and $a2$ for the server device 10 are provided such that when the received signal strength is less than a threshold strength set in advance for each process module, the allocation risk value of the corresponding process module reaches the upper limit value. That is, when the received signal strength becomes less than the threshold strength for either the process module M1 or M2, the allocation risk estimator unit 75 calculates the allocation risk value for prohibiting the allocation of the corresponding process module to the server device 10.

The allocation coefficients $b1$ and $b2$ are coefficients multiplied by the power supply risk value, and determine the degree of influence of the power supply risk value on the allocation risk value for the driving diagnosis ECU 30. The allocation coefficients $b1$ and $b2$ are provided such that the allocation risk value reaches the upper limit value when the remaining battery charge is less than a threshold set in advance for the process module. That is, when the remaining battery charge is lowered and the received signal strength becomes less than the threshold strength, the allocation risk estimator unit 75 calculates the allocation risk value for prohibiting the allocation of the corresponding process module to the driving diagnosis ECU 30.

The driving diagnosis ECU 30 can use less processing resources than the server device 10. The alert module M2 requires less processing resources than the learning module M1. For the driving diagnosis ECU 30, the allocation coefficients $a4$ and $b2$ of the alert module M2 are smaller than the allocation coefficients $a3$ and $b1$ of the learning module M1 (see FIG. 3). Specifically, relationships are $a4<a3$ and $b2<b1$. On the contrary, for the server device 10 having more available processing resources, the allocation coefficient $a1$ of the learning module M1 requiring a larger processing resource is smaller than the allocation coefficient $a2$ of the alert module M2. That is, a relationship is $a1<a2$.

From another point of view, for the driving diagnosis ECU 30 mounted in the delivery vehicle V, the allocation coefficients $a4$ and $b2$ of the alert module M2 are smaller than the allocation coefficients $a3$ and $b1$ of the learning modules M1, wherein the alert module requires real-time performance more than the learning module M1.

The allocation coefficients $a1$ to $a4$, $b1$ and $b2$ are provided such that in a case where the communication risk value and the power supply risk value are respectively less than predetermined values, the allocation risk value associated with allocating the learning module M1 to the driving diagnosis ECU 30 is greater than the allocation risk value associated with allocating the learning module M1 to the server device 10. The allocation coefficients $a1$ to $a4$, $b1$ and $b2$ are provided such that in this case, the allocation risk value associated with allocating the alert module M2 to the server device 10 is greater than the allocation risk value associated with allocating the alert module M2 to the driving diagnosis ECU 30.

As described above, when the communication status becomes a poor signal status while the remaining battery charge is sufficiently high, the allocation risk value in the case of allocating each process module to the server device 10 is greater than the allocation risk value in the case of allocating the each process module to the driving diagnosis ECU 30. When the lowering of the remaining battery charge occurs while the communication status is a good signal status, the allocation risk value in the case of allocating each process module to the driving diagnosis ECU 30 is greater than the allocation risk value in the case of allocating the each process module to the server device 10.

The allocation determiner unit 76 determines to which node a respective process module M1, M2 should be allocated, based on the calculated allocation risk value. The allocation determiner unit 76 determines to allocate a respective process module M1, M2 to, of the server device 10 and the driving diagnosis ECU 30, the node having the smaller allocation risk value. In particular, the allocation determiner unit 76 prohibits the allocation of the corresponding process module to the node having the allocation risk value that reaches the upper limit value.

With reference to FIGS. 3 to 6, the description will be given on examples of the allocation risk value calculated by the allocation risk estimator unit 75 and the allocation of the process modules M1 and M2 by the allocation determiner unit 76. As specific examples, the description will be given on the allocation control of the allocation control device 70 in four cases, wherein: a first case is a case where the communication status is a poor signal status and the remaining battery charge is sufficiently high; a second case is a case where the communication status is a good signal status and the remaining battery charge is sufficiently high; a third case is a case where the communication status is the poor signal status and the remaining battery charge is low; and a fourth case is a case where the communication status is the good signal status and the remaining battery charge is low. In the below examples, a state where the communication status is the good signal status is assumed to be a state where the received signal strength is so high that the allocation risk values in cases of allocating both process modules M1 and M to the server device 10 are less than the upper limit values. The state where the remaining battery charge is sufficiently high is assumed to be a state where the remaining battery charge is so high that the allocation risk values in cases of allocating the process modules M1 and M2 to the driving diagnosis ECU 30 are less than the upper limit values.

Figure 3:
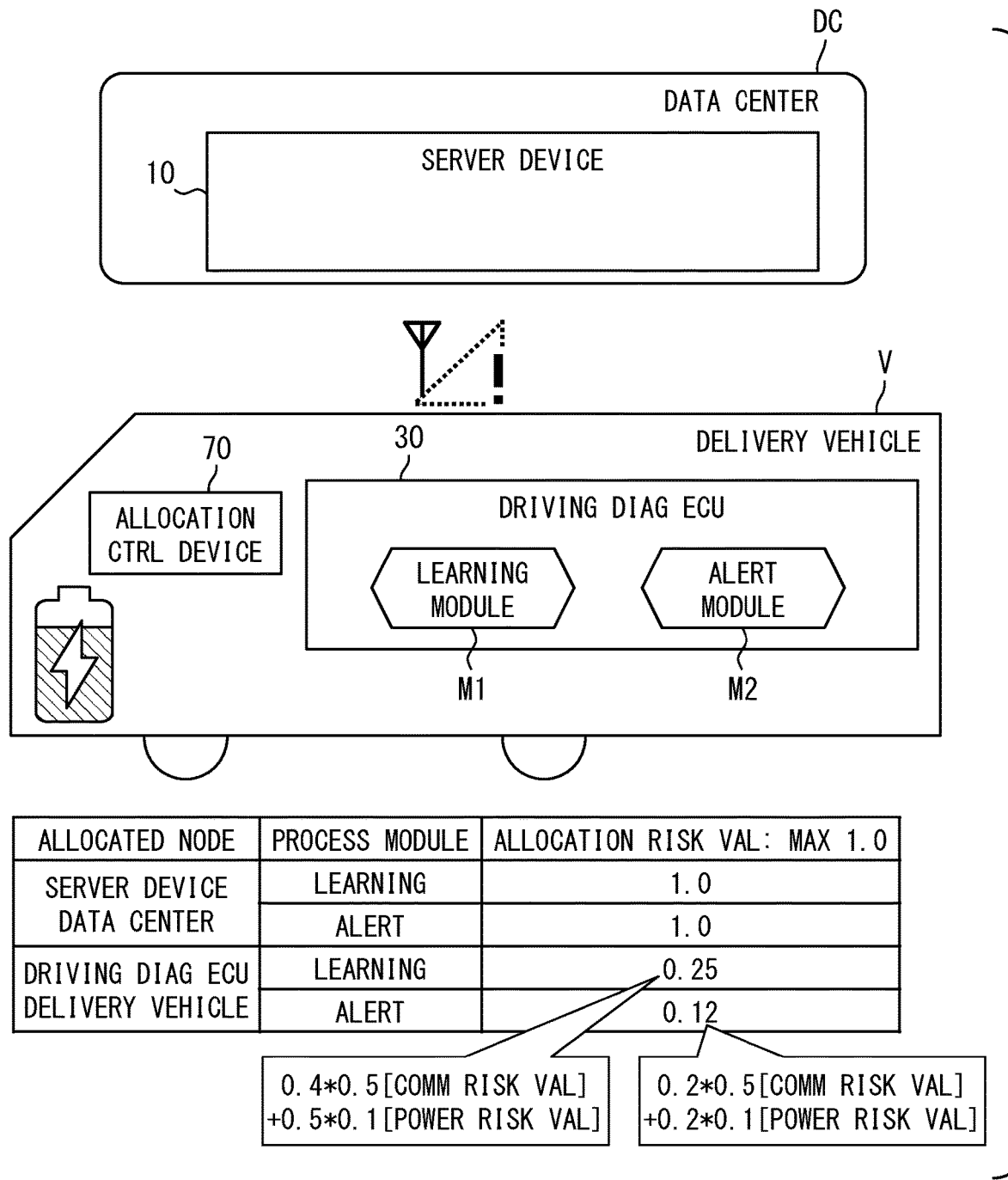
FIG. 3 is a diagram showing an example of allocating process modules.

FIG. 3 illustrates a case where the remaining battery charge of the delivery vehicle V is in a sufficiently high state and the communication status is the poor signal status. In the example shown in FIG. 3, it is assumed that the received signal strength is so low that the allocation risk values in cases of allocating the process modules M1 and M2 to the server device 10 reach the upper limit values. In this case, the allocation risk estimator unit 75 calculates the allocation risk value in the case of allocating the learning module M1 to the server device 10 to be 1.0 and the allocation risk value in the case of allocating the alert module M2 to be 1.0. The allocation risk value in the case of allocating the learning module M1 to the driving diagnosis ECU 30 is calculated to be 0.25, and the allocation risk value in the case of allocating the alert module M2 is calculated to be 0.12. Based on the above, the allocation determiner unit 76 determines to allocate both the learning module M1 and the alert module M2 to the driving diagnosis ECU 30 having the smaller allocation risk values. As a result, the generation of the driving characteristic model of the driver, the diagnosis of the driver's driving using the driving characteristic model, and the output of the alert according to the diagnosis result are all executed by the driving diagnosis ECU 30.

Figure 4:
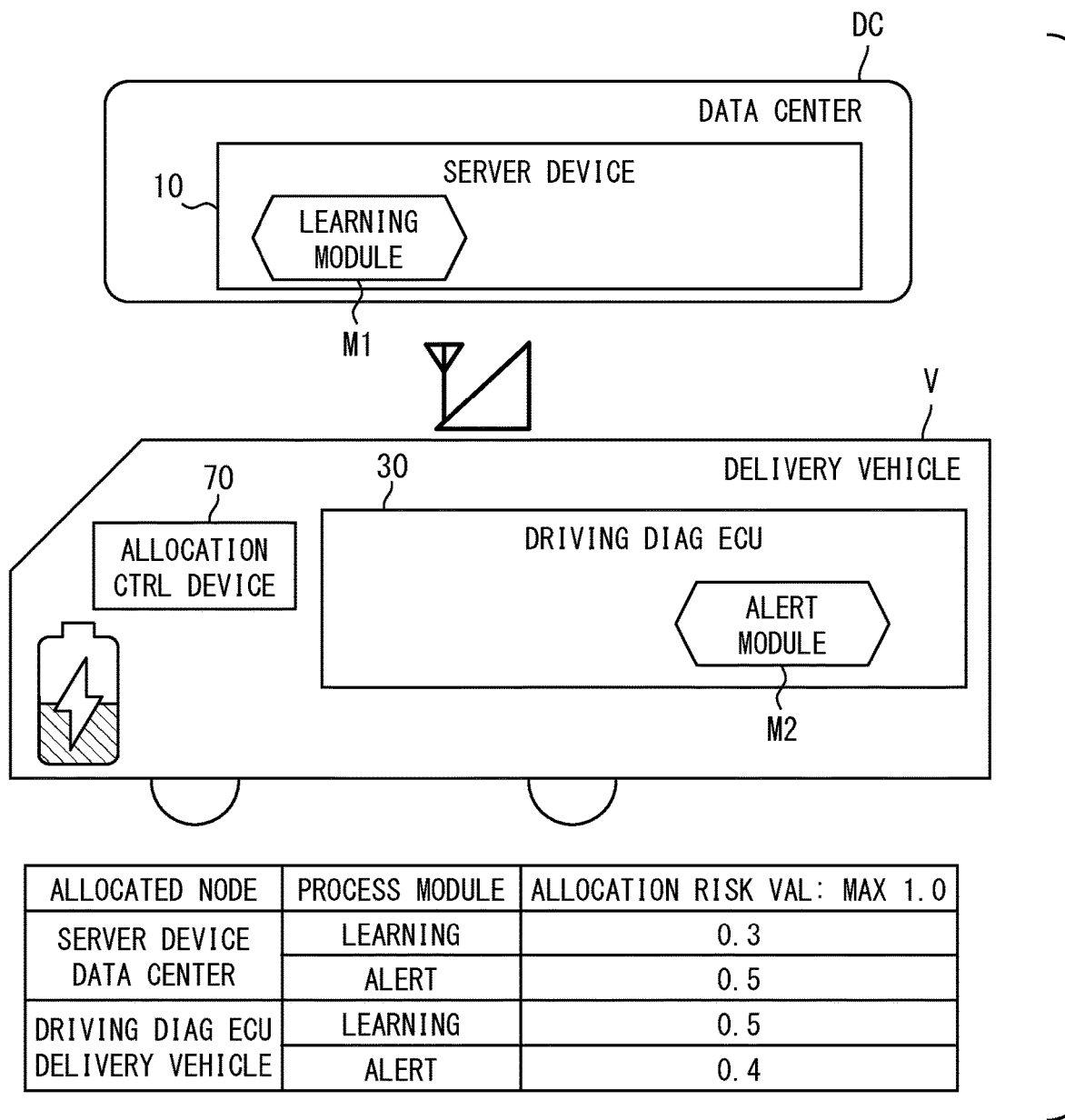
FIG. 4 is a diagram showing an example of allocating process modules.

FIG. 4 illustrate a case where the remaining battery charge of the delivery vehicle V is in the sufficiently high state and the communication status is the good signal status. In this case, the allocation risk estimator unit 75 calculates the allocation risk value in the case of allocating the learning module M1 to the server device 10 to be 0.3 and the allocation risk value in the case of allocating the alert module M2 to be 0.5. The allocation risk value in the case of allocating the learning module M1 to the driving diagnosis ECU 30 is calculated to be 0.5, and the allocation risk value in the case of allocating the alert module M2 is calculated to be 0.4. Based on the above, the allocation determiner unit 76 determines to allocate the learning module M1 to the server device 10 and the alert module M2 to the driving diagnosis ECU 30. As a result, the generation of the driving characteristic model of the driver is executed by the server device 10, and the diagnosis of the driver's driving using the driving characteristic model and the output of the alert according to the diagnosis result are executed by the driving diagnosis ECU 30.

When the allocation determiner unit 76 determines to allocate the learning module M1 to the server device 10 as in the example of FIG. 4, the allocation determiner unit 76 may output a signal instructing for scale-out of the server device 10. With this, the allocation control device 70 can effectively use the processing resource of the server device 10 of the data center DC.

Figure 5:
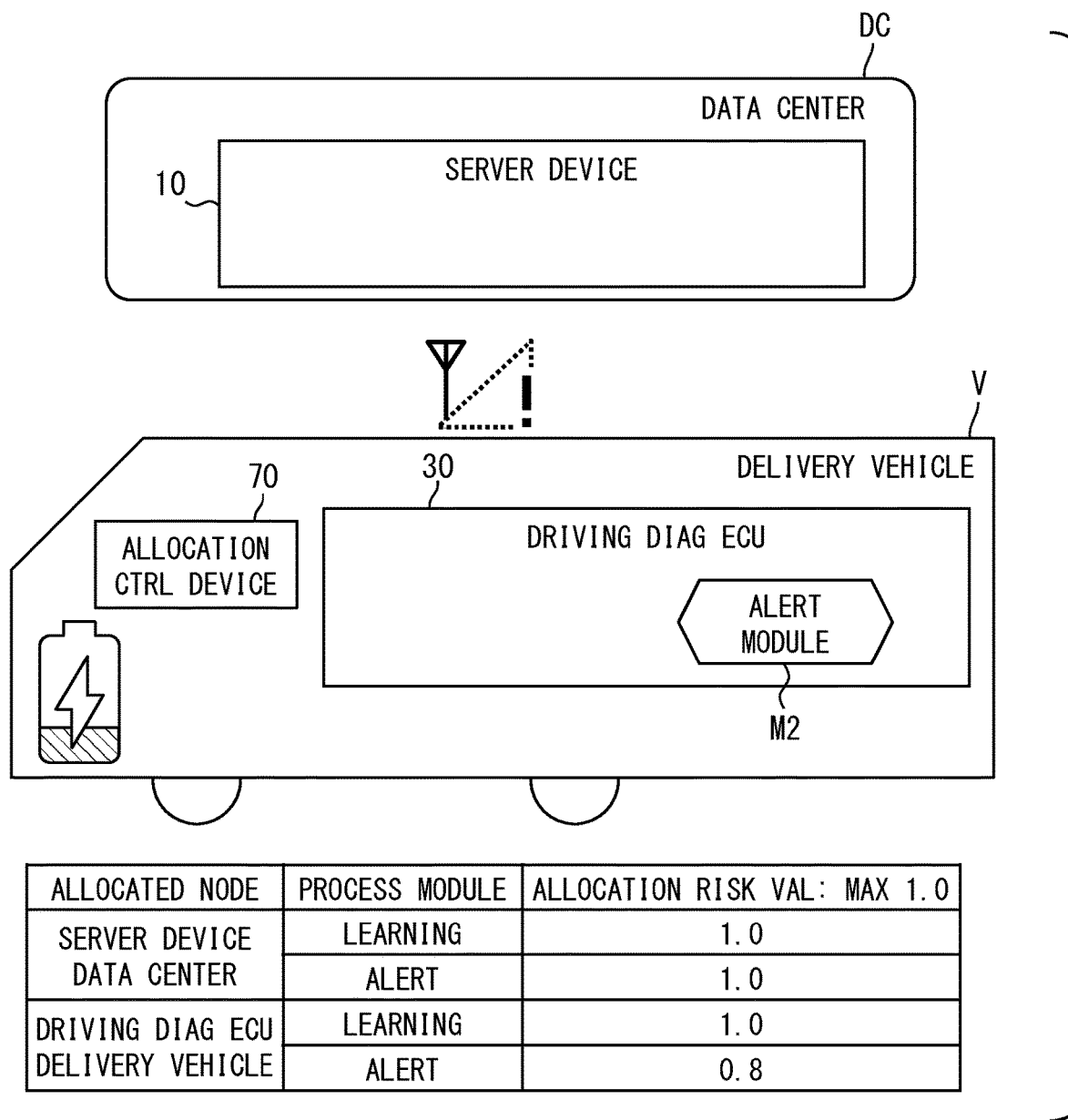
FIG. 5 is a diagram showing an example of allocating process modules.

FIG. 5 illustrates a case where the remaining battery charge of the delivery vehicle V is low and the communication status is the poor signal status. In the example shown in FIG. 5, it is assumed that the received signal strength is the same as that in FIG. 3. In the example of FIG. 5, it is further assumed that the remaining battery charge is lowered such that the allocation risk value in the case of allocating the learning module M1 to the driving diagnosis ECU 30 reaches the upper limit value and the allocation risk value in the case of allocating the alert module M2 to the driving diagnosis ECU 30 does not reach the upper limit value. In this case, the allocation risk estimator unit 75 calculates the allocation risk value in the case of allocating the learning module M1 to the server device 10 to be 1.0 and the allocation risk value in the case of allocating the alert module M2 to be 1.0. The allocation risk value in the case of allocating the learning module M1 to the driving diagnosis ECU 30 is calculated to be 1.0 and the allocation risk value in the case of allocating the alert module M2 is calculated to be 0.8. As described above, the allocation determiner unit 76 prohibits the allocation of the learning module M1 because the allocation risk values for both the server device 10 and the driving diagnosis ECU 30 reach the upper limit values. Meanwhile, the allocation determiner unit 76 determines to allocate the alert module M2 to the driving diagnosis ECU 30 having the small allocation risk value. As a result, the diagnosis of the driving's driver that does not use the driving characteristic model of the driver and the output of the alert according to the diagnosis result are executed by the driving diagnosis ECU 30.

Figure 6:
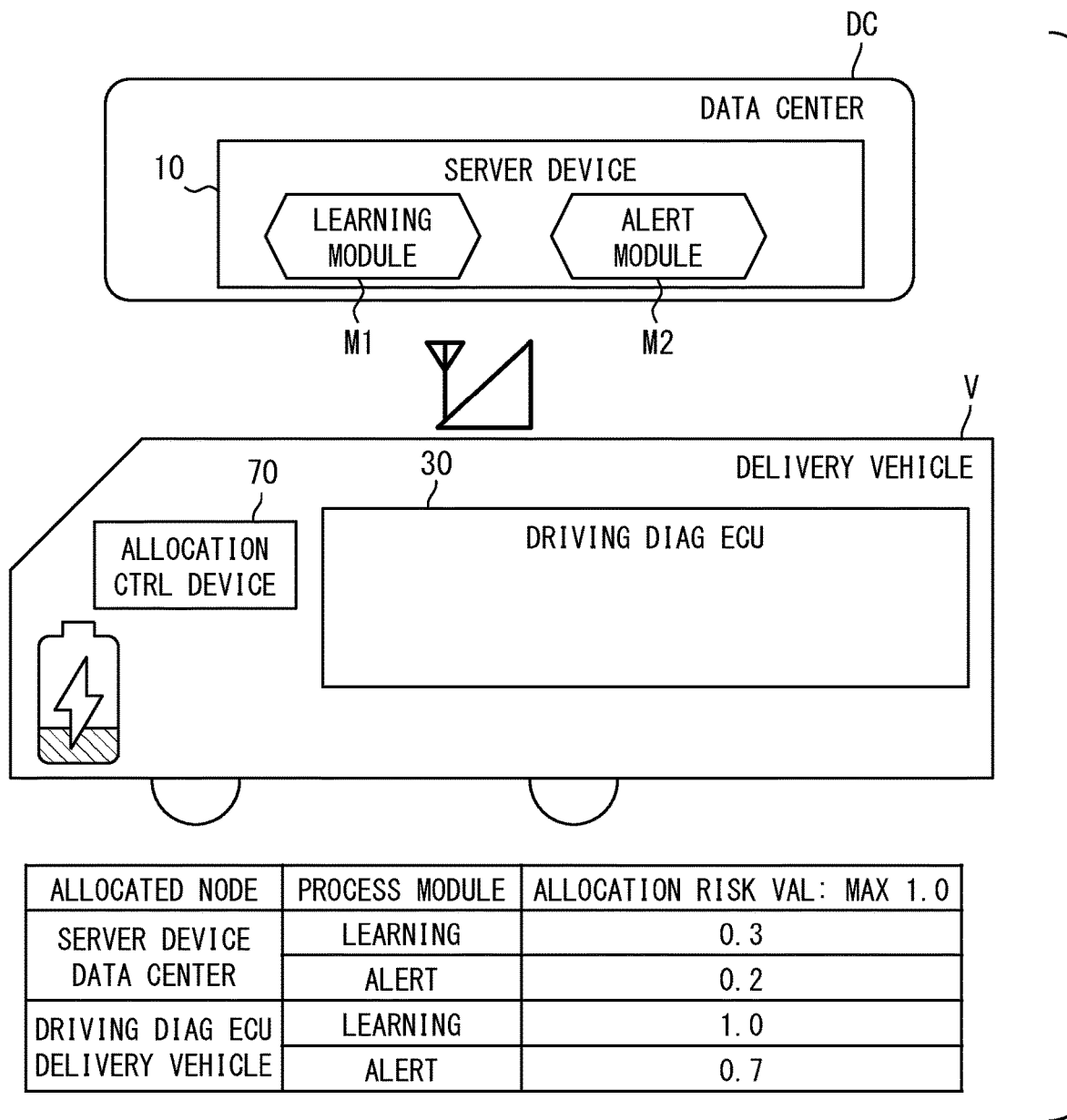
FIG. 6 is a diagram showing an example of allocating process modules.

FIG. 6 illustrates a case where the remaining battery charge of the delivery vehicle V is low and the communication status is the good signal status. In the example shown in FIG. 6, it is assumed that the received signal strength is the same as that in FIG. 4 and the remaining battery charge is the same as in FIG. 5. In this case, the allocation risk estimator unit 75 calculates the allocation risk value in the case of allocating the learning module M1 to the server device 10 to be 0.3 and the allocation risk value in the case of allocating the alert module M2 to be 0.2. The allocation risk value in the case of allocating the learning module M1 to the driving diagnosis ECU 30 is calculated to be 1.0 and the allocation risk value in the case of allocating the alert module M2 is calculated to be 0.7. Based on the above, the allocation determiner unit 76 determines to allocate both the learning module M1 and the alert module M2 to the server device 10 having the smaller allocation risk values. As a result, the generation of the driving characteristic model of the driver, the diagnosis of the driver's driving using the driving characteristic model, and the output of the alert according to the diagnosis result are all executed by the server device 10.

Figure 7:
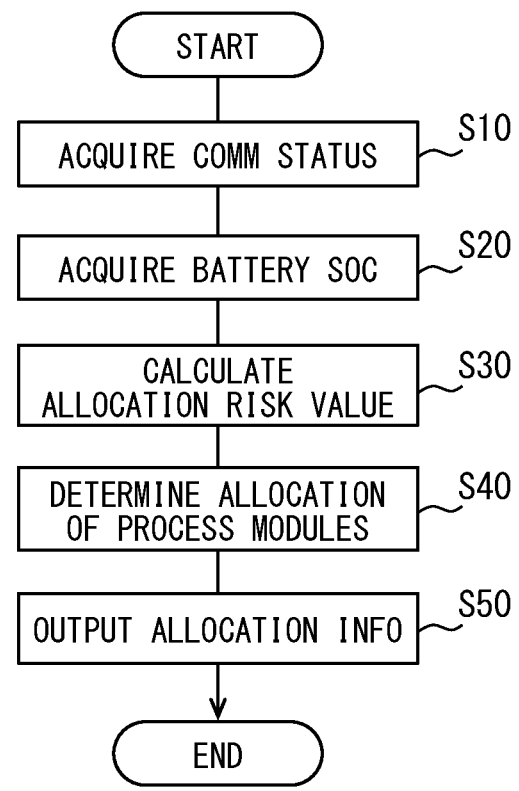
FIG. 7 is a flowchart showing an example of processing executed by the allocation control device of the first embodiment.

With reference to a flowchart of FIG. 7, the description will be given on examples of the allocation control process executed by the allocation control device 70 in order to implement the allocation of the process modules M1 and M2 described above. The allocation control device 70 repeatedly executes a series of processes shown in FIG. 7 while the delivery vehicle V is traveling by the manual driving.

First, in step S10, the allocation control device 70 acquires the communication status from the in-vehicle device 40. In step S20, the allocation control device 70 acquires the remaining battery charge from the battery ECU 60. Next, in step S30, the allocation control device 70 calculates the allocation risk values, based on the communication status and the remaining battery charge. In step S40, the allocation control device 70 determines to allocate a respective process module M1, M2 to the node having the smaller allocation risk value, based on the calculated allocation risk values. In step S50, the allocation control device 70 outputs the determined allocation information to the driving diagnosis ECU 30 and the server device 10, and causes the driving assistance system 1 to execute each of the process modules M1 and M2 according to the determined allocation.

Next, effects provided by the configuration of the allocation control device 70 of the first embodiment will be described.

The allocation control device 70 includes the allocation risk estimator unit 75 and the allocation determiner unit 76, wherein the allocation risk estimator unit 75 estimates the allocation risk of the process related to the driving assistance service being interrupted in cases of allocating the process module M1, M2 to specific nodes, based on the communication status between the nodes and the remaining battery charge of the delivery vehicle V, and the allocation determiner unit 76 determines to which node the process is to be allocated, based on the allocation risk.

According to this, the node to which the process module M1, M2 is allocated is determined based on the allocation risk of execution of the process module M1, M2 being interrupted, which allocation risk is estimated based on the communication status between the nodes and the remaining battery charge of the vehicle. Therefore, it is possible to avoid a situation in which the process related to the driving assistance service is interrupted due to at least one of the communication status or the remaining battery charge. Accordingly, the allocation control device 70 can continue the driving assistance service in the driving assistance system 1.

The allocation risk estimator unit 75 estimates the allocation risk for each of plural allocation patterns of allocating a respective process module M1, M2 to the driving diagnosis ECU 30 and the server device 10. The allocation determiner unit 76 determines to which node each of the process modules M1 and M2 should be allocated, based on an allocation risk magnitude relationship of each allocation pattern.

According to this, the allocation control device 70 can estimate the allocation risk for each of the nodes to which the process modules M1, M2 are allocatable, and then determine the allocation of the process modules M1, M2 based on a magnitude relationship thereof. Therefore, the allocation control device 70 can easily continue the process as compared with a case where the allocation risk is estimated only for a specific node.

The allocation risk estimator unit 75 estimates, based at least on the communication status, the allocation risk associated with the learning module M1 which learns the driving operation characteristics of the driver. The allocation determiner unit 76 determines to allocate the learning module M1 to the server device 10 when the communication status is the good signal status. According to this, when the communication status is the good signal status, the allocation control device 70 can allocate the learning module M1, which requires a relatively large amount of processing resource, to the server device 10 which has a large available resource. This makes it possible to restrict processing resource consumption in the in-vehicle ECU of the delivery vehicle V.

The allocation determiner unit 76 allocates the learning module M1 to the driving diagnosis ECU 30 when the communication status is the poor signal status and the remaining battery charge is sufficiently high. According to this, the allocation control device 70 allows the driving diagnosis ECU 30 to execute the learning module M1 when there is a high possibility that communication between the driving diagnosis ECU 30 and the server device 10 is impossible and a relatively large amount of the power is available to the driving diagnosis ECU 30. Therefore, the allocation control device 70 can avoid the alert module M2 from being unable to acquire the driving characteristic model generated by the learning module M1 due to the inability of the communication between the nodes. Therefore, the allocation control device 70 can reliably continue the driving assistance service.

The allocation determiner unit 76 stops the execution of the learning module M1 when the communication status is the poor signal status and the remaining battery charge is low. According to this, when there is a high possibility that the communication between the driving diagnosis ECU 30 and the server device 10 is impossible, and the power available to the driving diagnosis ECU 30 is small, the allocation control device 70 can stop the execution of the learning module M1 which requires a relatively large processing resource. Accordingly, the allocation control device 70 can avoid a situation in which another process such as the alert module M2 cannot be continued.

The allocation risk estimator unit 75 estimates the allocation risk related to the alert module M2 based at least on the remaining battery charge, wherein the alert module M2 diagnoses the driving operation of the driver. The allocation determiner unit 76 determines to allocate the alert module M2 to the driving diagnosis ECU 30 when the remaining battery charge is sufficiently high. According to this, when the remaining battery charge is of high level, the allocation control device 70 can allocate the alert module M2, which is required to have relatively high real-time performance, to the driving diagnosis ECU 30. Therefore, the allocation control device 70 can enhance the real-time performance of the driving assistance service.

The allocation determiner unit 76 allocates the alert module M2 to the server device 10 when the communication status is the good signal status and the remaining battery charge is low. According to this, the allocation control device 70 can avoid the alert module M2 from being unable to be executed due to the decrease in available power in the delivery vehicle V. Therefore, the allocation control device 70 can reliably continue the driving assistance service.

The allocation determiner unit 76 allocates the alert module M2 to the driving diagnosis ECU 30 when the communication status is the poor signal status and the remaining battery charge is low. According to this, when the communication status is the poor signal status, the allocation control device 70 gives priority to the allocation of the alert module M2 to the driving diagnosis ECU 30 even if the remaining battery charge is low. Therefore, the allocation control device 70 can reliably continue the driving assistance service.

Other Embodiments

The present disclosure is not limited to the illustrated embodiments. The present disclosure covers exemplary embodiments and modifications implementable by those skilled in the art based on the illustrated embodiments.

For example, the present disclosure is not limited to part and/or element combinations in the illustrated embodiments. The present disclosure enables implementation of various combinations. The present disclosure covers addition of portions to the embodiments. The present disclosure covers omission of parts and/or elements from the embodiments. The present disclosure covers part-and/or-element replacing and part-and/or-element combining between the embodiments. The technical scope disclosed is not limited to the description of the embodiments.

The processor of the above-described embodiments is a processing unit including one or more central processing units (CPU). Such a processor may be a processing unit including a graphics processing unit (GPU), a data flow processor (DFP), or the like in addition to the CPU. The processor may be a processing unit including a field-programmable gate array (FPGA), an IP core specialized for a particular process such as learning and inference of AI, etc. A respective processing circuit unit of such a processor may be individually mounted in a printed circuit board, or may be implemented by an application specific integrated circuit (ASIC), an FPGA, or the like.

Various non-transitory tangible storage media such as a flash memory and a hard disk are adoptable as a memory device for storing a control program. A form of such a storage medium may also be changed as appropriate. For example, the storage medium may be in a form of a memory card or the like, and may be inserted into a slot portion provided in an in-vehicle ECU and electrically connected to a control circuit.

The control devices and methods described in the present disclosure may be implemented by a special purpose computer created by configuring a memory and a processor programmed to execute one or more particular functions embodied in computer programs. Alternatively, the control devices and methods described in the present disclosure may be implemented by a special purpose computer created by configuring a processor provided by one or more special purpose hardware logic circuits. Alternatively, the control devices and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

In the above-described embodiments, the driving assistance system 1 is applied to the driving assistance for the delivery vehicle V for delivering the packages, but it may be applied to a vehicle other than the delivery vehicle V. For example, the driving assistance system 1 may be applied to driving assistance of vehicles (taxi, bus, or the like) for transporting passengers, or driving assistance of private vehicles owned privately.

In the above-described embodiments, it is assumed that the driving assistance system 1 includes the driving diagnosis ECU 30 of the delivery vehicle V and the server device 10 of the data center DC as the nodes. Instead of the server device 10, the driving assistance system 1 may include, as the node, an in-vehicle ECU mounted in another delivery vehicle V or a control device for a roadside device installed on a road. In this case, the allocation control device 70 determines the node to which the process module is allocated, from among these plural nodes including the driving diagnosis ECU 30.

In the above-described embodiments, the allocation control device 70 determines the allocation of the learning module M1 and the alert module M2. Alternatively, the allocation control device 70 may be configured to determine only the allocation of one of the process modules. The allocation control device 70 may be configured to determine the allocation of plural smaller process modules into which the functions of the process modules M1 and M2 are subdivided. The allocation control device 70 may have a configuration which determines allocation of process modules different in function division from the learning function and the diagnosis function.

In the above-described embodiments, the allocation control device 70 estimates the allocation risk for respective nodes 10, 30 constituting the driving assistance system 1. Alternatively, the allocation control device 70 may be configured to estimate the allocation risk for a specific node only.

In the above-described embodiments, the allocation control device 70 is mounted in the delivery vehicle V, but alternatively, it may be installed on the data center DC.

Figure 8:
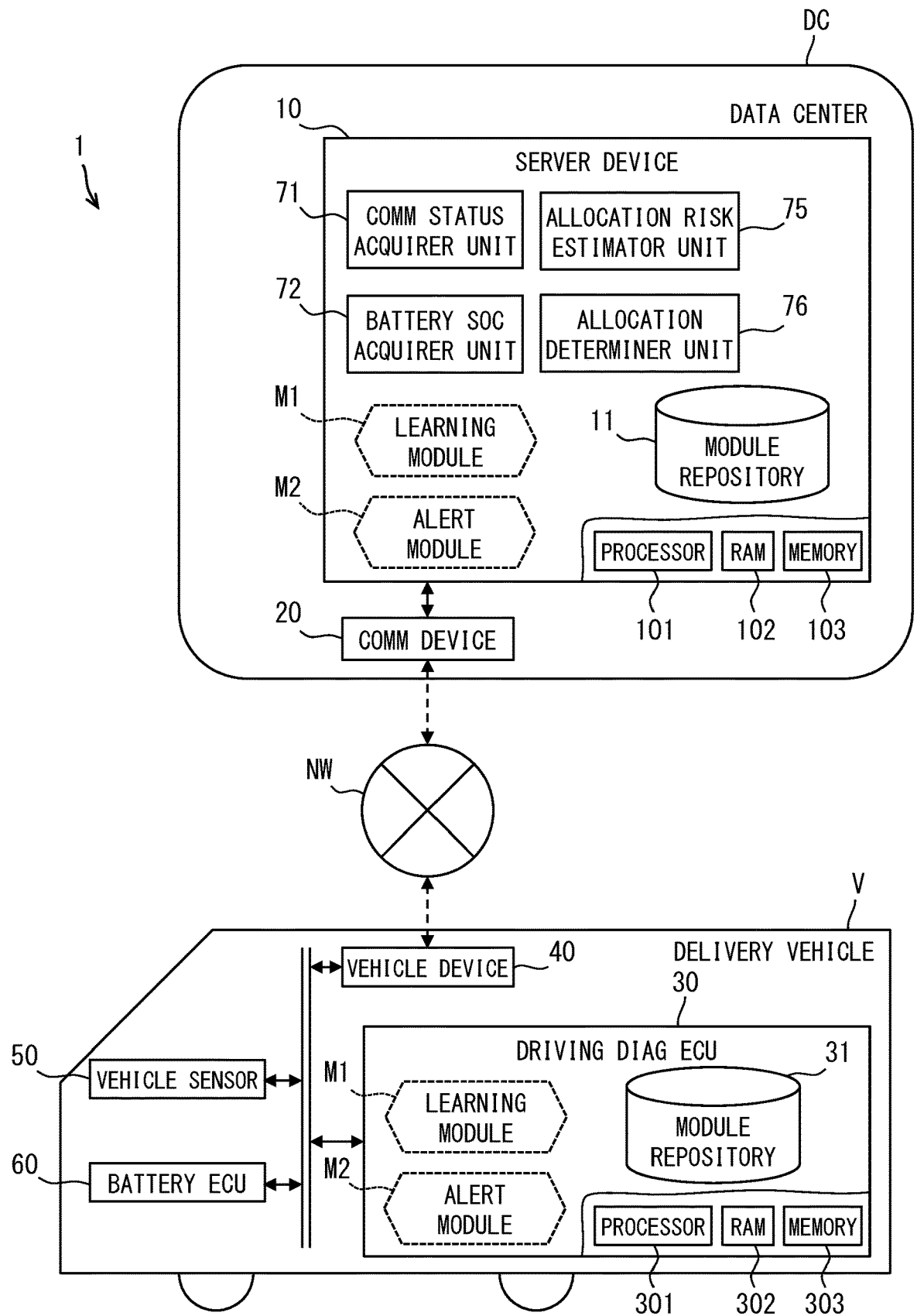
FIG. 8 is a block diagram showing an outline of a driving assistance system according to another embodiment.

In the above-described embodiments, it is assumed that the allocation control device 70 other than the driving diagnosis ECU 30 executes the allocation control of the process modules. Alternatively, the driving diagnosis ECU 30 may include the execution function of the allocation control. Also, as shown in FIG. 8, the server device 10 may be configured to execute the allocation control.

In the above-described embodiments, the allocation risk estimator unit 75 estimates the allocation risk based on both the communication status and the remaining battery charge. Alternatively, the allocation risk estimator unit 75 may estimate the allocation risk based on either of the communication status or the remaining battery charge. The allocation risk estimator unit 75 may estimate the allocation risk based on information other than the communication status and the remaining battery charge. For example, the allocation risk estimator unit 75 may take into consideration of a traveling abnormality due to a failure of the delivery vehicle V, for the allocation risk.

In the above-described embodiments, the allocation control device 70 executes the allocation control related to the process of the driving assistance service that diagnoses the driving operation of the driver and outputs the alert according to the diagnosis result. Alternatively, the allocation control device 70 may execute the allocation control related to the process of the driving assistance service that executes the failure diagnosis of the vehicle and outputs the alert according to the diagnosis result. The allocation control device 70 is applicable to allocation control related to processes of various forms of driving assistance services other than these.

In the above-described embodiments, the allocation control device 70 determines the communication status based on the received signal strength of the radio waves. Also, the allocation control device 70 may determine the communication status based on a degree of approach to an area where the communication status is unstable, by using current position information and map information of the delivery vehicle V.

The driving assistance system 1 corresponds to a system and a process allocation control system. The server device 10 corresponds to an external computer. The driving diagnosis ECU 30 corresponds to an in-vehicle computer. The allocation control device 70 corresponds to a computer and a process allocation control device. The process modules M1 and M2 correspond to processes. The delivery vehicle V corresponds to a vehicle.

What is claimed is:

1. A process allocation control method of controlling, in a system including an in-vehicle computer mounted in the vehicle and an external computer provided external to the vehicle as nodes communicable with each other, allocation of a process related to driving assistance of the vehicle to the nodes, the process allocation control method executed by at least one processor and comprising:

estimating an allocation risk of the process being interrupted in cases of allocating the process to either of the nodes, based on at least one of a remaining battery charge of the vehicle or a communication status between the nodes; and determining the node to which the process should be allocated, based on the allocation risk.

2. The process allocation control method according to claim 1, wherein:

estimating the allocation risk includes estimating the allocation risk in each of a plurality of patterns of allocating the process to each node; and determining the node includes determining the node to which the process should be allocated, based a magnitude relationship of the allocation risks in the plurality of patterns.

3. The process allocation control method according to claim 1, wherein:

estimating the allocation risk includes
  estimating the allocation risk that is associated with a learning process of learning a driving operation characteristic of a driver, based at least on the communication status; and
determining the node includes
  determining to allocate the learning process to the external computer when the communication status is a good signal status.

4. The process allocation control method according to claim 3, wherein:
estimating the allocation risk includes
  estimating the allocation risk associated with the learning process based on both the communication status and the remaining battery charge; and
determining the node includes
  determining to allocate the learning process to the in-vehicle computer when the communication status is a poor signal status and the remaining battery charge is high.

5. The process allocation control method according to claim 3, wherein:
estimating the allocation risk includes
  estimating the allocation risk associated with the learning process based on both the communication status and the remaining battery charge; and
determining the node includes
  determining to stop the allocation of the learning process to the nodes when the communication status is a poor signal status and the remaining battery charge is low.

6. The process allocation control method according to claim 1, wherein:
estimating the allocation risk includes
  estimating the allocation risk that is associated with a diagnosis process of diagnosing a driving operation of a driver, based at least on the remaining battery charge; and
determining the node includes
  determining to allocate the diagnosis process to the in-vehicle computer when the remaining battery charge is high.

7. The process allocation control method according to claim 6, wherein:
estimating the allocation risk includes
  estimating the allocation risk associated with the diagnosis process based on both the communication status and the remaining battery charge; and
determining the node includes
  determining to allocate the diagnosis process to the external computer when the communication status is a good signal status and the remaining battery charge is low.

8. The process allocation control method according to claim 7, wherein:
determining the node includes
  determining to allocate the diagnosis process to the in-vehicle computer when the communication status is a poor signal status and the remaining battery charge is low.

9. A process allocation control system comprising:
nodes communicable with each other,
wherein the nodes are an in-vehicle computer mounted in a vehicle and an external computer provided external to the vehicle,
wherein the process allocation control system controls allocation of a process related to driving assistance of the vehicle to the nodes,
the process allocation control system further comprising:
an allocation risk estimator unit that estimates an allocation risk of the process being interrupted in cases of allocating the process to either of the nodes, based on at least one of a communication status between the nodes or a remaining battery charge of the vehicle; and
an allocation determiner unit that determines the node to which the process should be allocated, based on the allocation risk.

10. A process allocation control device mounted in a vehicle to control, in a system including an in-vehicle computer mounted in the vehicle and an external computer provided external to the vehicle as nodes communicable with each other, allocation of a process related to driving assistance of the vehicle to the nodes,
the process allocation control device comprising:
an allocation risk estimator unit that estimates an allocation risk of the process being interrupted in cases of allocating the process to either of the nodes, based on at least one of a communication status between the nodes or a remaining battery charge of the vehicle; and
an allocation determiner unit that determines the node to which the process should be allocated, based on the allocation risk.

11. A server device that is configured to communicate with an in-vehicle computer mounted in a vehicle and that is provided external to the vehicle,
the server device comprising:
an allocation risk estimator unit that estimates an allocation risk of the process being interrupted in cases of allocating the process to either of the in-vehicle computer and the server device, based on at least one of remaining battery charge of the vehicle or a communication status between the in-vehicle computer and the server device; and
an allocation determiner unit that determines the node to which the process should be allocated, based on the allocation risk.

* * * * *